United States Patent Office 3,458,235
Patented July 29, 1969

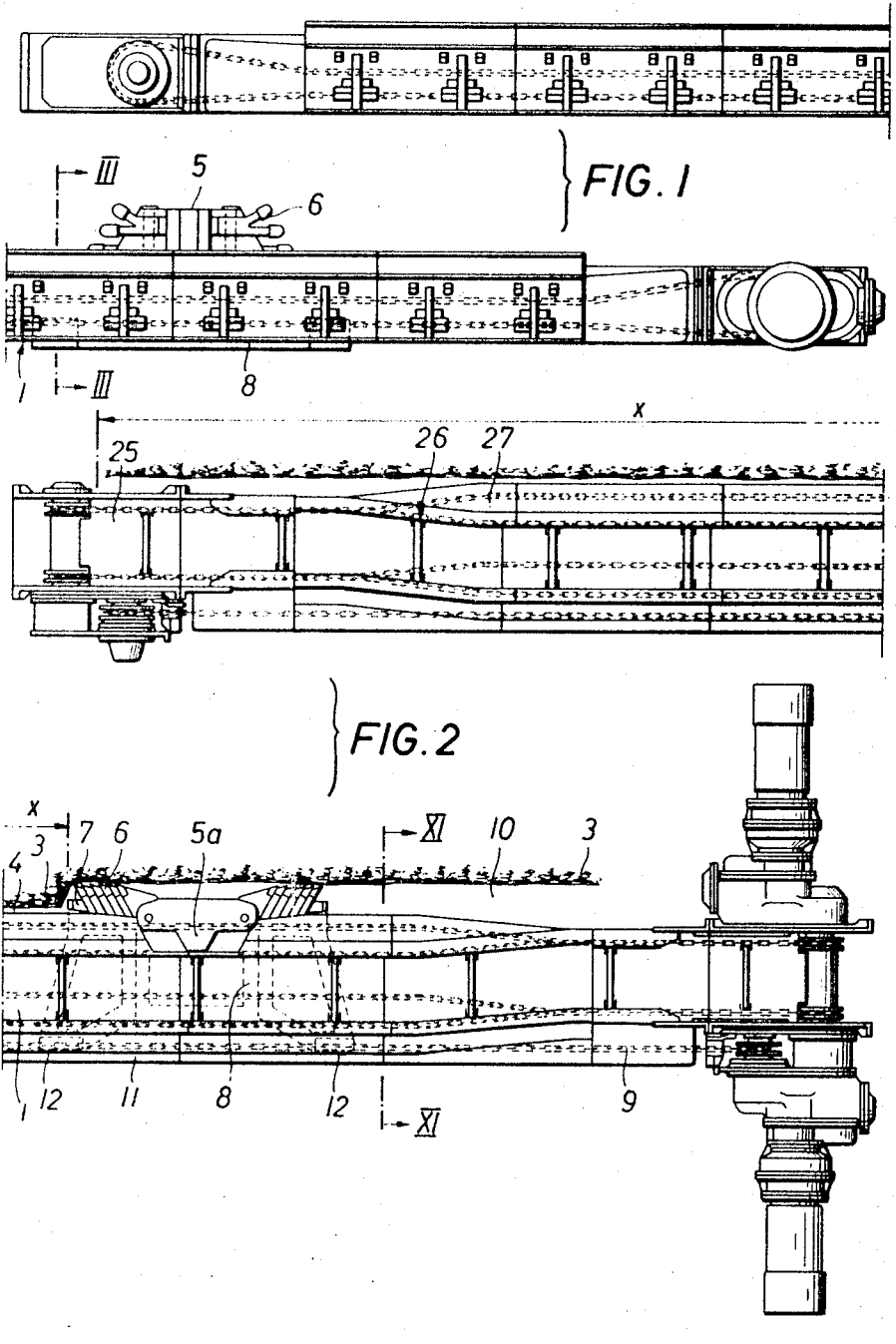

3,458,235
SCRAPER-CHAIN CONVEYOR, PARTICULARLY FACE CONVEYOR, SUITABLE FOR COOPERATION WITH A GETTING MACHINE
Arnold Römer and Johannes Rinio, Herne, Germany, assignors to Maschinenfabrik und Eisengiesseri A. Beien, Herne, Germany
Filed Feb. 29, 1968, Ser. No. 709,476
Claims priority, application Germany, Mar. 4, 1967, M 73,043; June 20, 1967, M 74,444; Aug. 14, 1967, M 75,140
Int. Cl. E21c 27/42; B65g 15/60, 41/00
U.S. Cl. 299—34      8 Claims

ABSTRACT OF THE DISCLOSURE

A scraper chain conveyor for use as a face conveyor in the getting of coal or some other mineral or ore which occurs in deposits like coal, suitable for guiding a coal plough or the like getting machine, comprises a plurality of flexibly interconnected trough sections forming a trough. Each of said trough sections has two codirectional side walls and a raised level bottom interconnecting said side walls. The side walls are affixed to the raised level bottom of the trough section at an angle of about 45° and slope from the conveyor base upwards towards the waste side so that the side wall actually facing the longwall coal face constitutes a ramp up which the broken mineral can be pushed by the getting machine into the trough. Endless scraping chain means extend through said trough and the raised level bottom is disposed between the upper conveying runs and the lower returning runs of said chain means.

Background of the invention

This invention relates to a scraper-chain conveyor for use as a face conveyor in the getting of coal or of some other mineral or ore which occurs in deposits like coal, suitable for guiding a coal plough or the like getting machine.

In conventional scraper-chain conveyors each trough section is of rectangular section and the roughly U-section sides of the trough stand vertically on the floor of the working and are hence perpendicular to the base of the conveyor and to the raised bottom of the trough. If such a conveyor is provided with a loading ramp this is formed by an additional sloping apron on the side of the conveyor or a correspondingly shaped separately attachable casing.

Summary of the invention

It is an object of the present invention to provide a scraper-chain conveyor, particularly face conveyor, suitable for cooperation with a getting machine and having a trough of the kind in which the flights are pulled by chains, in which the overall cross section itself is already adapted to satisfy a number of needs which arise in mining and particularly in the getting of coal.

According to another object of the invention the necessity of providing separate loading ramps is to be avoided.

A further object of the invention is to contrive the conveyor in such a manner that it can be advanced into direct contact with the working face.

A still further object of the invention is to design the conveyor so that it is suitable for holding a peeling getting machine up against the working face and for positively guiding the same.

To attain these objects, the present invention provides a scraper chain conveyor for use as a face conveyor in the getting of coal or of some other mineral or ore which occurs in deposits like coal, suitable for guiding a coal plough or the like getting machine which comprises (a) a plurality of flexibly interconnected trough sections forming a trough and each having two codirectional side walls and a raised level bottom interconnecting said side walls, each of said side walls being affixed to the raised level bottom of the trough at an angle of about 45° and sloping from the conveyor base upwards towards the waste side so that the side wall actually facing the coal face constitutes a ramp up which the broken mineral can be pushed by the getting machine into the trough; and (b) endless scraping chain means passing through said trough, the raised level bottom of the trough being disposed between the upper conveying runs and the lower returning runs of said chain means.

The cross section of the trough which results from this arrangement permits the side wall of the trough on the working face side to be used as a heavily inclined loading ramp up which the broken mineral can be pushed into the trough. Special ramps or box-like casings providing sloping surfaces need not therefore be attached to the side of the trough. The sloping side wall of the trough of the scraper-chain conveyor already fulfills the purposes of a ramp. Moreover, the conveyor can be advanced by conventional rams or like means until the bottom edge of the side wall forming the loading ramp makes direct contact with the working face immediately above the floor. Above this sloping side wall of the conveyor trough an unobstructed passage remains which is sufficient for accommodating and guiding the main body of a getting machine which carries the peeling blades, particularly of a coal plough. The coal plough can ride directly on the sloping surface of the side wall of the conveyor and the weight and lateral thrust of the plough can be directly utilized for holding down the side wall of the conveyor trough.

The proposed structural configuration of the trough itself comprising two rearwardly angled parallel side walls that rise from the base of the conveyor and slope upwards towards the waste permits either the one or the other side wall of the trough to be used as a ramp, since the conveyor can be used either side up and turned upside down in which case the previously conveying side of the conveyor will become the empty side and the empty side will take the place of the conveying side, whereas the side wall previously facing the waste will form the ramp on the side nearest the face. In either position the conveyor has the above-described favourable properties. In other words, the trough sections of the conveyor have a cross section substantially representing a parallelogram. The space avialable under the side wall on the waste side of the trough can be utilized for the accommodation therein of accessory elements.

In a preferred embodiment the raised level bottom of the trough may consist of two superimposed sheet metal plates which are splayed apart along each of their longitudinal edges, thereby in cross section forming a bifurcation of which one shank at one edge is upwardly angled perpendicularly to the side wall of the traugh section to which it is attached and one shank at the other edge is downwardly angled perpendicularly to the side wall on this side of the trough section to which it is attached, the two other shanks of the two bifurcations at opposite edges extending to the side walls to which they are likewise attached in the plane of the sheet metal plates. The off-angled shank of each bifurcation thus perpendicularly abuts that part of the side wall which slopes from the level of the plates inwards towards the trough center, thereby bracing and providing support for the sloping side wall and rigidifying the same on each side of the trough. Longituidnal channels of enlarged cross section are thus formed in the conventional manner in each side of the trough and provide accommodation for robust connecting elements between consecutive troughs.

In this form of construction the side walls of the trough may each be bent to shape from a single strip of sheet metal to provide a cross section in the form of a leaning U-section. Alternatively a similarly shaped roller steel leaning U-section may be used. The leaning U-section provides a sloping side panel with parallel upper and lower flanges extending parallel to the conveyor base, i.e. to the plane of the raised bottom of the trough.

In an alternative structural embodiment the two side walls of the trough may be composed of four identical V-sections, and each side wall consists of two rolled steel V-sections so disposed that the sections forming the conveyor sides above the raised level bottom of the trough section are laterally offset in relation to the two V-sections forming the conveyor sides below the raised level bottom of the trough section. By thus offsetting the two upper V-sections in relation to the two lower V-sections two side walls can be formed which slope at an angle of 45°.

In constructing a conveyor trough which has the cross section proposed by the invention, the bottom of the trough could naturally also be formed of a single plate instead of being composed of two superimposed plates as hereinbefore mentioned.

The proposed scraper-chain conveyor is particularly suitable for use in association with a coal plough or a plough-type getting machine having a main body which carries the cutting tools and a floorplate which extends underneath the conveyor to the waste side where it is coupled to a pulling chain accommodated in the side wall of the trough on the waste side of the conveyor. In such an association of the proposed conveyor with a plough-type getting machine the following features in combination have proved to be particularly satisfactory in practical applications: (a) at least along the length of the working face traversed by the getting machine the conveyor trough sections have their side walls on the coal face side sloping downwards towards the working face at an acute angle, so that their bottom edges can be advanced into contact with the working face by conventional ram cylinders; (b) the main body of the getting machine is disposed substantially directly above the sloping side wall on the coal face side, maximum penetration of the cutting tools into the face being determined by the projecting bottom edge of the side wall of the conveyor trough, and (c) the main body of the getting machine is positively guided by riding on the sloping side wall of the trough projecting towards the face underneath the main body of the plough and above the sword-like plough entraining plate which extends across the underside of the conveyor trough.

The sloping side wall of the trough of the scraper-chain conveyor thus itself fulfills a plurality of functions whilst being held up against the working face by the conventional rams for advancing the conveyor. A longitudinal unobstructed channel is formed above said sloping side wall and this replaces the otherwise necessary working channel for the passage of the plough. The main body of the getting machine carrying the cutting tools can be accommodated and guided in this channel. In other words, the full width of the main body of the getting machine can be accommodated above the surface of the sloping side wall of the conveyor trough. This sloping side wall forms a sliding surface upon which the getting machine can ride and at the same time the weight of the getting machine will hold down the conveyor. Only the cutting tools which bite into the face project beyond the bottom edge of the side wall. Although the bottom edge of this side wall bears against the foot of the face, the mineral can be peeled off down to the foot of the face level with the floor of the working and loaded into the trough. A special channel which previously had to be provided for the passage of the getting machine is absent, since space for the passage of the getting machine has been made available directly above the sloping side wall of the conveyor trough. At the same time this side wall guides the getting machine and holds it up against the face.

Should it be desired to accommodate the pulling rope or chain for the plough-type getting machine on the face side of the conveyor, provision to meet this requirement can also be made in the chain conveyor proposed by the invention. In such a case the casing for guiding the getting machine and for accommodating the pulling rope or chain may be formed of two parallel side walls which slope at the same angle as the side walls of the trough. This casing and the major part of the width of the main body of the getting machine will in such case be located directly above the sloping side wall of the trough on the face side of the conveyor. In such an arrangement it is advisable to provide a slipper plate which extends below the getting machine to the foot of the working face, and which is hingeably connected to the bottom edge of that side of the casing which rests on the sloping side wall of the trough.

Another feature for further improving the scraper-chain conveyor proposed by the invention consists in providing a final deflecting trough section at the head and tail ends of the conveyor composed of trough sections with sloping side walls, said deflecting trough sections guiding the conveying and returning runs of the scraper chain, which along the length of the conveyor is relatively laterally offset above and below the raised level bottom of the trough, back again into vertical alignment, and for this purpose the side walls of the deflecting trough being twisted from a sloping position at one end of the trough into a vertical position at the other end of the trough, whereas the width of the raised bottom of the trough remains unchanged.

Brief description of the drawings

Several preferred embodiments of the invention will now be described by way of example and with reference to the accompanying drawings, in which:

FIG. 1 is a side elevation of a scraper-chain conveyor according to the present invention in association with a coal plough;

FIG. 2 is a top plan view of the scraper-chain conveyor and coal plough of FIG. 1 showing the general arrangement in relation to the coal face;

Figure 3:
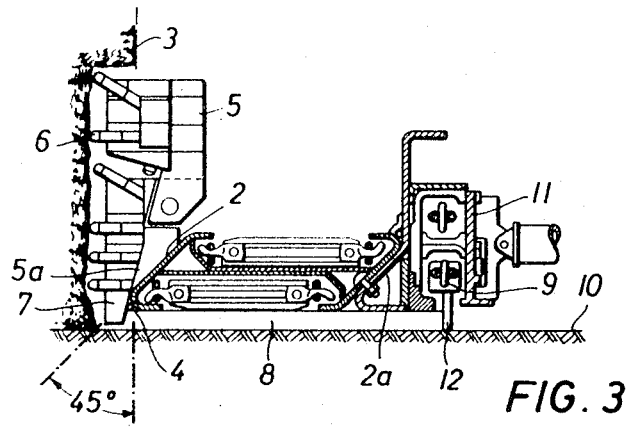
FIG. 3 is a cross section taken on the line III—III of FIG. 1.

In the drawings the scraper-chain conveyor 1 at a longwall face 3 is composed of trough sections flexibly connected together so as to form a trough. The pulling sheaves and the return sheaves of the face conveyor and of a coal plough 5 are located at opposite ends of the conveyor. In the trough sections the conveying and return chains are conducted at different levels separated by plates 13 forming the raised level bottom of the trough.

The scraper-chain conveyor trough sections have side walls 2 and 2a sloping at an acute angle downwards towards the coal face. The angle of slope is about 45°. Since the side walls 2a on the waste side of the trough slope at the same angle as the side walls 2 on the working face side, the cross section of the trough will substantially be in the form of a parallelogram. The conveyor 1 can be advanced towards the longwall face 3 by ram cylinders or like devices. The projecting bottom edges 4 of the side walls 2 of the trough sections are always advanced into contact with the longwall face 3 in zone x (FIG. 2) which precedes the coal plough 5 and later also in the region behind the coal plough.

The coal plough 5 comprises a main body 5a which is guided on the top of the sloping side wall 2 and carries adjustable cutting tools 6 and 7. The tools 6 bite into the coal face, whereas the tools 7 cut the coal away from the floor of the working to the depth of penetration of the peeling tools 6. The main body 5a of the plough therefore remains in the region of the sloping side wall 2 of the trough upon which it slides. Behind the cutting tools 6 and 7 the main body 5a carries a plate 8 which extends across the underside of the trough like a sword and which on the waste side of the trough is attached to one of the runs of the pulling chain 9. Said plate may consist of one or several parts.

In view of its disposition between the main body of the plough and the plate 8 the sloping side wall 2 of the trough which projects under the main body 5a of the plough provides a positive guiding surface for this forward part of the getting machine. In addition thereto and in a manner known in the art anchoring lugs 12 on the plate 8 may naturally also be positively guided in the duct 11 containing the pulling chain on the waste side of the trough.

The cutters 7 of the plough undercut the coal at the foot of the longwall face to loosen a slice corresponding in thickness to the distance the conveyor is advanced by the rams. In other words, the cutters 7 clear a strip on the floor at the foot of the longwall face, which is needed for supporting the projecting bottom edge 4 of the side wall 2 when the conveyor is advanced. Since the main body of the plough is located above the side wall 2 of the trough the latter can remain in its fully advanced position even during the passage of the coal plough. In other words, the conveyor requires no freedom for breathing, i.e. for rearwardly yielding to the passage of the plough and a uniform depth of penetration of the cutting tools is thus ensured.

FIGS. 4 to 7 illustrate the structure of the trough on a larger scale. In the form of construction according to FIGS. 4 and 5 the side walls of the trough are formed from strips of sheet metal bent to a leaning U-section and the two side walls are transversely interconnected by a raised level double bottom 13.

Figure 6:
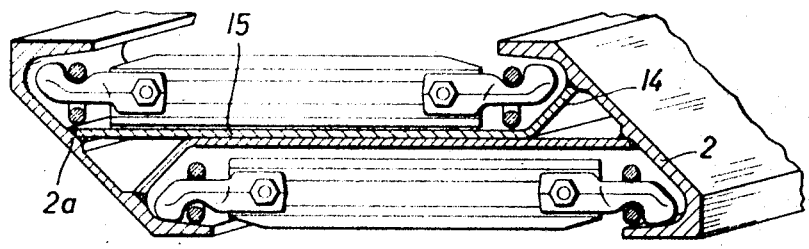
FIGS. 6 and 7 are cross sections through two further embodiments of troughs of different construction.

In the embodiment according to FIG. 6 the side walls 2 and 2a each consist of undivided rolled sections and the cross sections of the two side walls are identical.

Each of the two plates forming the double bottom 13 of the trough is formed with a bent edge 14 on one side to form a shank which roughly perpendicularly abuts the corresponding sloping side wall. The other edge of each plate has a shank 15 forming a coplanar extension of the plate. Both shanks 14 and 15 are welded to the side walls 2 and 2a and the triangular space defined by the two shanks on the same side of the trough forms a longitudinal channel 16 which at the ends of the trough may contain the necessary coupling means and the elements for aligning adjoining troughs.

However, instead of the conveyor trough having a double bottom a single plate may be provided and provided at each longitudinal edge with a bifurcated profile which may then constitute the two shanks 14 and 15 that are welded to the side walls.

Figure 7:
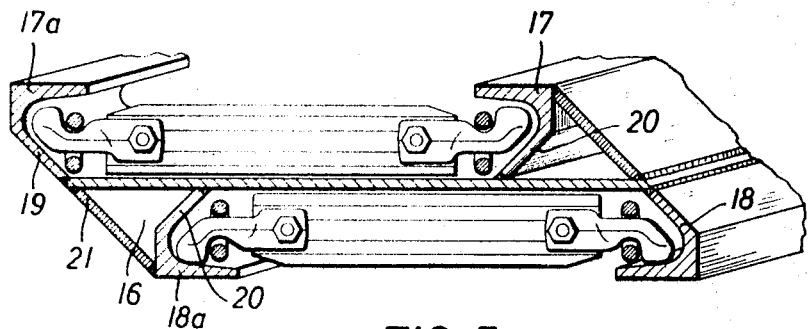

In the embodiment illustrated in FIG. 7 each side wall of a trough section consists of two substantially V-shaped rolled sections 17, 18 and 17a, 18a respectively. These four rolled sections are identical, they merely differ with regard to the positions in which they are assembled. The raised level bottom 13 in this instance is a single flat plate extending from one side wall to the other, its edges being welded to angularly positioned flanks 19 of the sections 17a and 18. The inwardly sloping flanks 20 of the sections 17 and 18a are also welded to the trough bottom but at points spaced inwardly away from the side walls. The triangular channels 16 are covered by welded fairings 21 forming extensions of the sloping flanks of the rolled sections 17a and 18.

Figure 8:
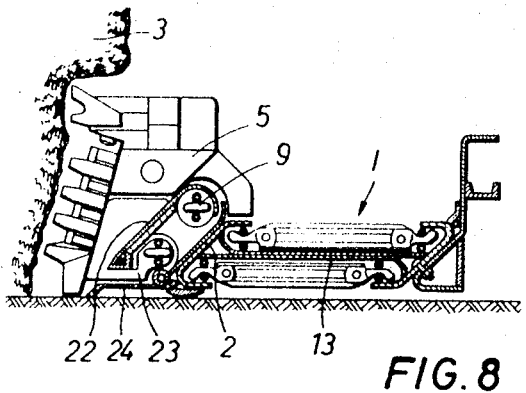
FIG. 8 is a cross section through a scraper-chain conveyor according to the invention in association with a coal plough exclusively positively guided on the coal face side of the conveyor.
Figure 9:
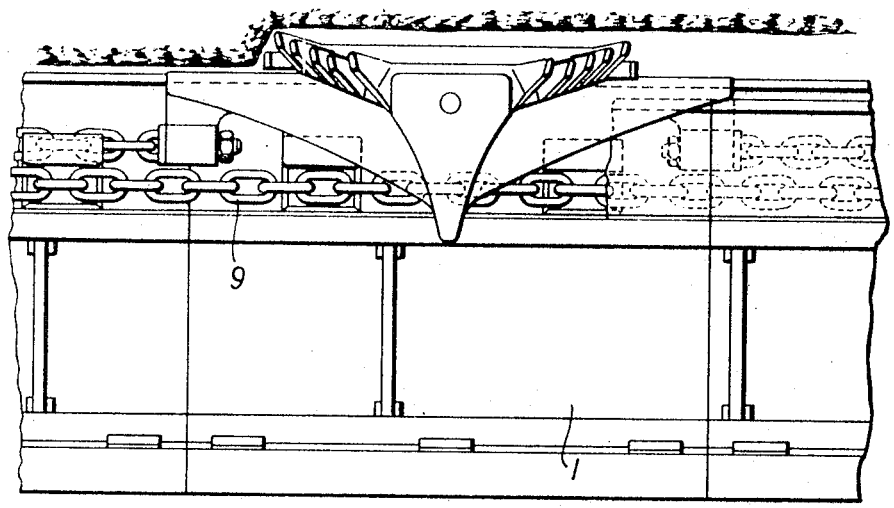
FIG. 9 is a top plan view thereof.

FIGS. 8 and 9 illustrate the cooperation of the trough of the scraper-chain conveyor with a coal plough 5 in an embodiment in which it is desired that the pulling and tail ends of the endless chain 9 for the plough should be located on the coal face side of the conveyor and accommodated in a casing 22. This casing has walls parallel to the side wall 2 of the trough, the two walls being connected at the top by an arched section. This flat casing contains the channels for the forward and return runs of the endless pulling chain 9 for the plough, the channels being at different elevational levels and laterally offset. An arm 23 of the coal plough 5 extends into the casing 22 from below and one of the two runs of the chain is coupled to it. Hingeably attached to the sloping bottom wall of the casing 22 is a slipper plate 24 which reaches forward to the foot of the longwall face 3.

Figure 10:
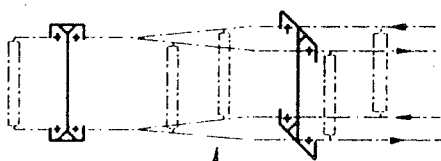
FIG. 10 is a schematic representation of the manner in which the scraper chain is deflected at the head and tail ends of the conveyor.

As will be understood from FIG. 2 at least one chain-deflecting trough section 26 is provided at the end of the conveyor adjoining the return sheave 25. This region is illustrated in FIG. 10 with the omission of the trough section itself, the drawing merely indicating the manner in which the outer chains of the conveyor are arranged to travel. The chains which travel along the length of the face conveyor in relatively laterally offset positions are conducted inside the deflecting trough sections into a common vertical plane before they run over the sheave and change over in a reliable manner from the upper to the lower level or conversely, as the case may be.

Figure 12:
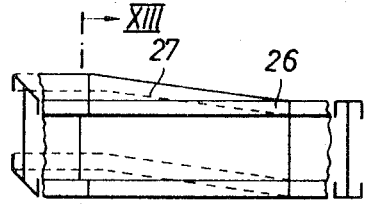
FIG. 12 is a top plan view of a modification of a deflecting trough section for use at the head and tail ends of the conveyor.
Figures 11, 13:
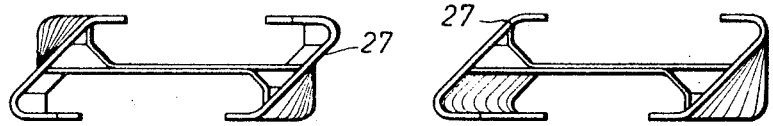
FIG. 11 is a cross section taken on the line XI—XI of FIG. 2.
FIG. 13 is a cross section taken on the line XIII—XIII of FIG. 12.
Figure 4:
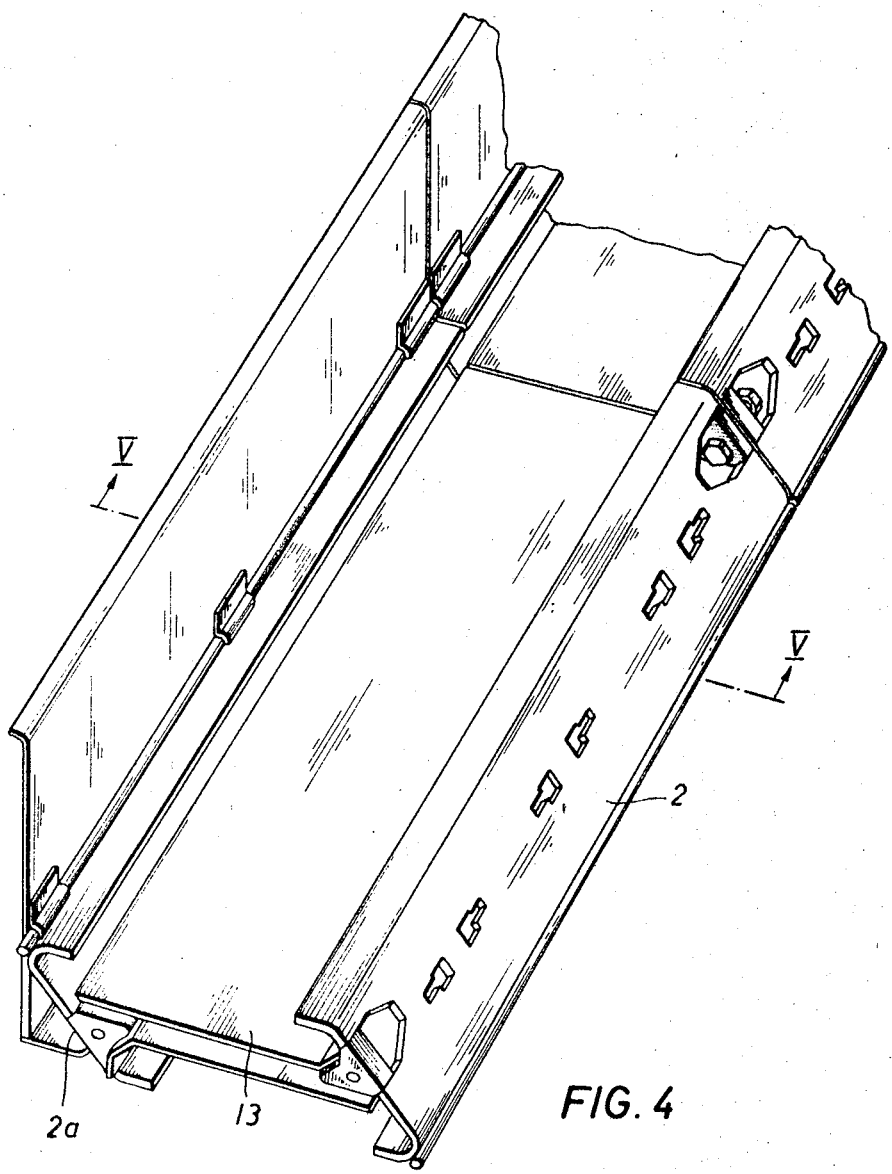
FIG. 4 is a fragmentary perspective view of the trough of the scraper-chain conveyor.
Figure 5:
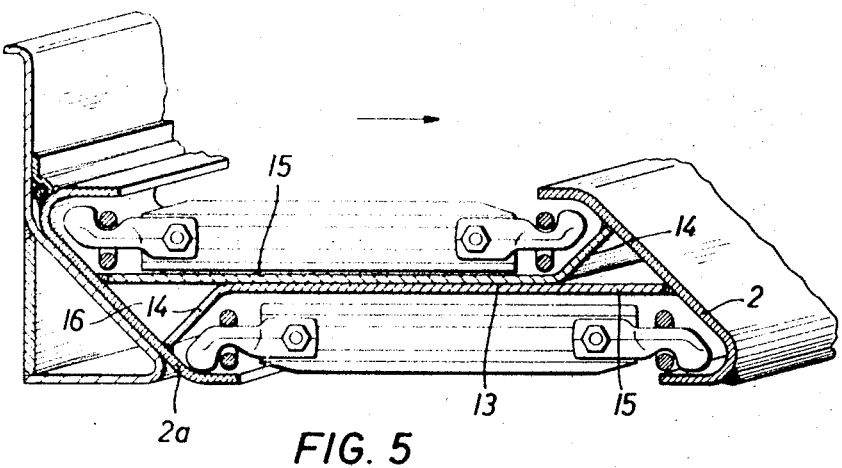
FIG. 5 is a cross section taken on the line V—V in FIG. 4.

The deflecting conveyor trough section is constructed in a manner substantially correcponding to the construction of the other trough sections. The width of the raised bottom plates of the trough remains the same. However, the side walls 27 of the deflecting trough section twist back from a sloping position (FIG. 11) at one end of the trough section into a vertical position at the other end of the trough section. The side walls 27 may be thus twisted into a vertical plane about a line defined by the abutting longitudinal edge of the bottom plate of the trough section, as likewise shown in FIG. 11. Alternatively this change from a sloping position into the vertical may also be accomplished by turning the side walls about their upper or bottom edges in the manner illustrated in FIGS. 12 and 13.

The above-described embodiment relates to the use of the proposed conveyor as a face conveyor at a longwall coal face. It will be readily apparent that the conveyor could be similar employed in a potash mine or for getting some other mineral or ore.

What is claimed is:

1. A scraper-chain conveyor for use as a face conveyor in the getting of coal or of some other mineral or ore which occurs in deposits like coal, suitable for guiding a coal plough or the like getting machine, comprising:
 (a) a plurality of flexibly interconnected trough sections forming a trough and each having two codirectional side walls and a raised level bottom interconnecting said sidewalls, each of said side walls being affixed to the raised level bottom of the trough at an angle of about 45° and sloping from the conveyor base upwards towards the waste side so that the side wall actually facing the coal face constitutes a ramp up which the broken mineral can be pushed by the getting machine into the trough; and (b) endless scraping chain means passing through said trough, the raised level bottom of the trough being disposed between the upper conveying runs and the lower returning runs of said chain means.

2. In a scraper-chain conveyor as claimed in claim 1, associated with a coal plough or the like getting machine having a main body which carries cutting tools and a floorplate which extends underneath the conveyor to the waste side where it is coupled to a pulling chain accommodated in the side wall on the waste side of the conveyor, the following combination of features:

(a) at least along the length of the working face traversed by the getting machine the conveyor trough sections have their side walls on the coal face side sloping downwards towards the working face at an acute angle, so that their bottom edges can be advanced into contact with the working face by conventional ram cylinders;

(b) the main body of the getting machine is disposed substantially directly above the sloping side wall on the coal face side, maximum penetration of the cutting tools into the face being determined by the projecting bottom edge of the side wall of the conveyor trough, and (c) the main body of the getting machine is positively guided by riding on the sloping side wall of the trough projecting towards the face underneath the main body of the plough and above the sword-like plough entraining plate which extends across the underside of the conveyor trough.

3. A scraper-chain conveyor as claimed in claim 1, comprising at least one final deflecting trough section at the head and tail ends of the conveyor composed of trough section's with sloping side walls, said deflecting trough sections guiding the conveying and returning runs of the scraper chain, which along the length of the conveyor is relatively laterally offset above and below the raised level bottom of the trough, back again into vertical alignment, and for this purpose the side walls of the deflecting trough being twisted from a sloping position at one end of the trough into a vertical position at the other end of the trough, whereas the width of the raised bottom of the trough remains unchanged.

4. A scraper-chain conveyor as claimed in claim 1 associated with a coal plough or the like getting machine in which the pulling chain of the getting machine is guided in a special casing provided on the face side of the conveyor, wherein said casing has two parallel sides inclined to the same angle of slope as the side wall of the trough and covered at the top by an arched member, the major part of the width of both sides of the casing resting upon and being supported by said sloping side wall of the trough.

5. A scraper-chain conveyor as claimed in claim 4, comprising a slipper plate extending below the getting machine as far as the foot of the coal face and hingeably attached for vertical deflection to the bottom edge of the side of the casing which directly rests on the side wall of the trough.

6. A scraper-chain conveyor as claimed in claim 1, wherein the raised level bottom of each trough section consists of two superimposed sheet metal plates which are splayed apart along each of their longitudinal edges, thereby in cross section forming a bifurcation of which one shank at one edge is upwardly angled perpendicularly to the side wall of the trough section to which it is attached and one shank at the other edge is downwardly angled perpendicularly to the side wall on this side of the trough section to which it is attached, the two other shanks of the two bifurcations at opposite edges extending to the side walls to which they are likewise attached in the plane of the sheet metal plates.

7. A scraper-chain conveyor as claimed in claim 6, wherein the side walls of each trough section are each bent from preferably a single sheet metal strip in the form of a leaning U-section of which the top and bottom flanges are parallel to the base of the conveyor and hence to the plane of the raised level bottom of the trough section.

8. A scraper-chain conveyor as claimed in claim 6, wherein the two side walls of each trough section are composed of four identical V-sections, and each side wall consists of two rolled steel V-sections so disposed that the sections forming the conveyor sides above the raised level bottom of the trough section are laterally offset in relation to the two V-sections forming the conveyor sides below the raised level bottom of the trough section.

References Cited

UNITED STATES PATENTS

| 2,691,514 | 10/1954 | Lobbe | 299—34 |
| 3,137,484 | 6/1964 | Fontein | 299—34 |

FOREIGN PATENTS

| 624,036 | 4/1963 | Belgium. |
| 688,459 | 2/1940 | Germany. |

ERNEST R. PURSER, Primary Examiner

U.S. Cl. X.R.

198—109, 204